(12) United States Patent
Imai et al.

(10) Patent No.: US 8,773,749 B2
(45) Date of Patent: Jul. 8, 2014

(54) VARIABLE FOCUSING LENS AND MICROSCOPE

(75) Inventors: Tadayuki Imai, Atsugi (JP); Masahiro Sasaura, Atsugi (JP); Jun Miyazu, Atsugi (JP); Shogo Yagi, Atsugi (JP); Seiji Toyoda, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 127 days.

(21) Appl. No.: 13/375,212

(22) PCT Filed: Jun. 11, 2010

(86) PCT No.: PCT/JP2010/003908
§ 371 (c)(1),
(2), (4) Date: Nov. 29, 2011

(87) PCT Pub. No.: WO2010/143449
PCT Pub. Date: Dec. 16, 2010

(65) Prior Publication Data
US 2012/0075694 A1    Mar. 29, 2012

(30) Foreign Application Priority Data

Jun. 12, 2009  (JP) .................................. 2009-141486
Jun. 1, 2010   (JP) .................................. 2010-126111

(51) Int. Cl.
*G02F 1/00*   (2006.01)
*G02F 1/29*   (2006.01)
*G02F 1/07*   (2006.01)
*G02F 1/03*   (2006.01)

(52) U.S. Cl.
USPC ............................ 359/322; 359/254; 359/315

(58) Field of Classification Search
USPC ......... 359/245, 250–254, 315, 316, 321–323, 359/335, 380, 666; 345/38, 48–50
See application file for complete search history.

(56) References Cited

U.S. PATENT DOCUMENTS 4,181,399 A   1/1980 McMahon
4,525,042 A   6/1985 Muchel
(Continued)

FOREIGN PATENT DOCUMENTS

EP   1884805   2/2008
EP   1898258   3/2008
(Continued)

OTHER PUBLICATIONS

Takashi Kaneko, et al., "Optical Microscope Expanded Depth of Field Using Dynamic Focusing Lens for Micro Parts Assembling", Denso Technical Review, vol. 3, No. 1, p. 52-58, 1998.
(Continued)

*Primary Examiner* — Thomas K Pham
*Assistant Examiner* — Brandi Thomas
(74) *Attorney, Agent, or Firm* — Workman Nydegger

(57) ABSTRACT

A variable focusing lens is provided that can change the focal length at a high speed. The variable focusing lens includes: a single crystal electrooptic material having inversion symmetry; a first anode formed on a first surface of the electrooptic material; a second cathode provided to have an interval to the first anode; and a first cathode and a second anode that are formed on a second surface opposed to the first surface and that are formed at positions opposed to the first anode and the second cathode. An optical axis is set so that, when light enters through a third face orthogonal to the first surface, light exists through a fourth surface opposed to the third face. A voltage applied between the first and the second pair of electrodes is changed to thereby change the focal point of light emitted from the fourth surface of the electrooptic material.

18 Claims, 8 Drawing Sheets

(56) References Cited

U.S. PATENT DOCUMENTS

| | | | |
|---|---|---|---|
| 4,614,408 A * | 9/1986 | Mir et al. | 359/250 |
| 5,020,885 A | 6/1991 | Shibaguchi | |
| 5,272,561 A | 12/1993 | Shibaguchi | |
| 2007/0181913 A1 * | 8/2007 | Li | 257/213 |
| 2008/0158633 A1 | 7/2008 | Mogi | |
| 2009/0219378 A1 | 9/2009 | Nakamura et al. | |
| 2010/0265559 A1 * | 10/2010 | Uchikawa et al. | 359/256 |

FOREIGN PATENT DOCUMENTS

| | | |
|---|---|---|
| EP | 2233966 A1 | 9/2010 |
| JP | 62-251718 A | 11/1987 |
| JP | H01-230017 | 9/1989 |
| JP | 11-064817 | 3/1999 |
| JP | 2007-41215 A | 2/2007 |
| JP | 2007-310104 | 11/2007 |
| JP | 2010-26079 A | 2/2010 |
| WO | 2006/137408 A | 6/2006 |
| WO | 2009/084692 A1 | 12/2007 |

OTHER PUBLICATIONS

Imai T. et al., "Fast Varifocal Lenses Based on $KTa_{1-x}Nb_xO_3$ (KTN) Single Crystal", NTT Technical Review, vol. 7, No. 12, Dec. 2009, p. 1-5.

Yagi S. et al., "A tool for 3-D imaging: KTN scanner and varifocal lens", The Journal of Three Dimensional Images, vol. 23, No. 2, Jul. 4, 2009, p. 31.

International Search Report Issued in Application No. PCT/JP2010/003908 on Sep. 7, 2010.

International Preliminary Report on Patentability for Application No. PCT/JP2010/003908, filed Jun. 11, 2010, dated Dec. 22, 2011.

English translation of International Preliminary Report on Patentability issued on Jan. 26, 2012, for Application No. PCT/JP2010/003908, filed Jun. 11, 2010.

Extended European Search Report dated Oct. 11, 2012, issued in European Application No. 10785980.3, filed Jun. 11, 2010.

\* cited by examiner

VARIABLE FOCUSING LENS AND MICROSCOPE

TECHNICAL FIELD

The present invention relates to a variable focusing lens and a microscope. In particular, the present invention relates to a variable focusing lens that uses an optical material having an electrooptic effect to provide a changeable focal length and a microscope having the variable focusing lens.

BACKGROUND ART

Conventionally, optical components such as optical lenses and prisms have been used for optical devices such as a camera, a microscope, or a telescope, electrophotographic printing apparatuses such as a printer or a copier, optical recording apparatuses such as DVD, and optical devices for communication and industrial applications for example. A general optical lens has a fixed focal length. However, some of the above-described devices and apparatuses may use a so-called variable focusing lens. The variable focusing lens is a lens having a focal length that can be adjusted depending on the situation. A conventional variable focusing lens mechanically adjusts the focal length by combining a plurality of lenses. In the case of such a mechanical variable focusing lens however, the applicable scope was limited because of factors such as a response speed a manufacture cost, downsizing, and power consumption.

To solve this, such a variable focusing lens was considered for example that has an optical lens composed by a transparent medium using a substance having a variable refractive index and another variable focusing lens for which the shape of the optical lens is deformed instead of changing the position of the optical lens. As the former variable focusing lens, such a variable focusing lens has been suggested in which an optical lens is composed of liquid crystal. This variable focusing lens is structured so that liquid crystal is sealed by a container made of transparent substance (e.g., a glass plate). The inner side of the container is machined to have a spherical surface and liquid crystal is formed to have a lens-like shape. The inner side of the container also has a transparent electrode. By changing the voltage applied to this electrode, the electric field applied to the liquid crystal can be controlled. This can consequently control the refractive index of the liquid crystal by the voltage, thus achieving the variable control of the focal length (see Patent Publication 1 for example).

As the latter variable focusing lens, the lens having a deformable shape is frequently made of liquid. For example, the variable focusing lens disclosed in Non-patent Publication 1 is structured so that a space sandwiched between glass plates is filled with liquid such as silicon oil. The glass plates are machined to have a thin thickness. By externally applying a pressure to the glass plates by a lead zirconate titanate (PZT) piezo actuator, the lens entirely constituted by oil and the glass plates is deformed to thereby control the focal position. This variable focusing lens has the same operating principle as that of a lens of an eyeball.

Among the above-descried optical devices, a microscope is a device that is expected for practical application by the introduction of a variable focusing lens. A microscope has a very shallow depth of field because the microscope uses an objective lens having a high numerical aperture (NA). Thus, if a microscope observes a three-dimensional object as a measuring object, the microscope can simultaneously observe only a partial region of the three-dimensional object covered by the focal point height. Thus, in order to obtain the total image of the three-dimensional object, the three-dimensional object must be observed while gradually moving the lens system of a stage having thereon the measuring object in the up-and-down direction. Another technique also has been nearly established according to which the image is photographed at every fixed height while moving the stage and a plurality of photographed images are processed to synthesize a stereoscopic image.

In recent years, among microscopes, confocal microscopes have been used in a wider range of applications. With reference to FIG. 1, the principle of the confocal microscope will be described. In this system, light emitted from a measuring object 1 is converted by a lens 3 (generally referred to as an objective lens) to parallel beam that is subsequently collected by a lens 4. At a position of the light collection point, a pinhole 5 having a similar diameter to that of the spot diameter is placed and the power of light having passed through the pinhole 5 is detected by a light detector 6. A case will be considered where a measuring object 2 is placed immediately below the measuring object 1. As shown by the broken line of FIG. 1, the light emitted from the measuring object 2 passes through the lenses 3 and 4 and is subsequently collected at a position lower than the position of the pinhole 5. The light emitted from the measuring object 2 expands again when reaching the height of the pinhole, thus causing a remarkably-reduced amount of light passing through the pinhole 5. Specifically, this system can detect only an optical signal emitted from the position of the measuring object 1.

When a measuring object has different objects from which light is emitted, it is difficult for a general microscope to extract only the information regarding the measuring object because the light from these objects is superimposed as noise on the light from the measuring object. A confocal microscope on the other hand can extract only the information regarding the measuring object by adjusting the layout of the optical systems. However, only the information regarding an object at the position of the measuring object 1 of FIG. 1 can be simultaneously extracted. Thus, in order to obtain the total image of the object, three-dimensional data must be collected by gradually moving the object in the up-and-down and left-and-right directions. The object can be moved, without moving the measuring object itself, in the left-and-right direction by an apparatus that uses a component such as a galvano mirror for rapidly deflecting the direction of light beam (light deflector). However, the measuring object was generally moved in the up-and-down direction by mechanically moving the measuring object.

However, it took a long time to acquire the entire data regarding a measuring object if a conventional microscope including a confocal microscope was used to perform the series of measurements by mechanically moving in the up-and-down direction a stage having thereon the measuring object. To solve this, if the focal point can be electrically controlled by a variable focusing lens instead of moving the stage, the measurement accuracy can be improved and an improved scanning speed also can be expected.

Conventional variable focusing lenses include: a variable focusing lens for mechanically adjusting the focal length; a variable focusing lens for controlling the refractive index by applying an electric field to liquid crystal; and a variable focusing lens whose shape is deformed by a PZT piezo actuator for example. However, any of these conventional variable focusing lenses had a limited response speed required to change the focal length and thus could not be used for a high-speed response of 1 ms or shorter, thus failing to catch a high-speed phenomenon.

It is an objective of the present invention to provide a variable focusing lens that can change the focal length at a high speed and a microscope that can use the variable focusing lens to measure a three-dimensional object including information in the height direction at a high speed.

CITATION LIST

Patent Literature

PTL1 Japanese Patent Laid-Open No. H11-064817

Non Patent Literature

NPL1: Kaneko Suguru et al., "Kahen Shouten Renzu Wo Mochiita Choushouten Shind Shikaku Kikou", Denso Technical Review, VoL 3, No. 1, p. 52-58, 1998

DISCLOSURE OF INVENTION

In order to achieve the objective as described above, one embodiment of a variable focusing lens according to the present invention includes: a single crystal electrooptic material having inversion symmetry; a first anode formed on a first surface of the electrooptic material; a first cathode that is formed on a second surface opposed to the first surface and that is formed at a position opposed to the first anode; a second cathode that is formed on the first surface and that is provided at to have an interval to the first anode; and a second anode that is formed on the second surface, that is provided to be opposed to the second cathode, and that is provided to have an interval to the first cathode. An optical axis is set so that, when light enters through a third face orthogonal to the first surface, the light passes through a first pair of electrodes composed of the first anode and the first cathode and subsequently passes through a second pair of electrodes composed of the second anode and the second cathode to subsequently exit through a fourth surface opposed to the third face. A voltage applied between the first pair of electrodes and the second pair of electrodes is changed to thereby change the focal point of light emitted from the fourth surface of the electrooptic material.

One embodiment of a microscope according to the present invention is a microscope in which an optical system includes a variable focusing lens. The variable focusing lens is structured so that a first base unit element, a half-wave plate, and a second base unit element are provided in series along an optical axis direction. The first base unit element and the second base unit element apply electric fields vertical to the optical axis and are arranged so that each direction of the electric fields is perpendicular to each other. The half-wave plate is provided so as to form an angle of 45 degrees to the direction along which the electric fields from the first base unit element and the second base unit element are applied. Each of the first and second base unit element includes: a single crystal electrooptic material having inversion symmetry; first anode formed on a first surface of the electrooptic material; a first cathode that is formed on a second surface opposed to the first surface and that is formed at a position opposed to the first anode; a second cathode that is formed on the first surface and that is provided at to have an interval to the first anode; and a second anode that is formed on the second surface, that is provided at a position opposed to the second cathode, and that is provided to have an interval to the first cathode. An optical axis is set so that, when light enters through a third face orthogonal to the first surface, the light passes through a first pair of electrodes composed of the first anode and the first cathode and subsequently passes through a second pair of electrodes composed of the second anode and the second cathode to subsequently exit through a fourth surface opposed to the third face. A voltage applied between the first pair of electrodes and the second pair of electrodes is changed to thereby change the focal point of light emitted from the fourth surface of the electrooptic material.

As described above, according to the present invention, such a variable focusing lens can be realized that includes a single crystal electrooptic material having inversion symmetry and 2N electrodes formed on a surface of the electrooptic material. The variable focusing lens can apply opposite voltages to electrode pairs adjacent to each other to thereby change a focal length at a high speed.

This variable focusing lens eliminates, when being included in an optical system of a microscope, the necessity to mechanically move a stage having thereon a measuring object in the up-and-down direction. This can consequently shortens the time required to measure a stereoscopic image. If a measuring object dynamically changes at a high speed, the high-speed phenomenon can be captured.

BEST MODE FOR CARRYING OUT THE INVENTION

The following section will describe an embodiment of the present invention with reference to the drawings. The variable focusing lens of this embodiment is composed of: an electrooptic material; and an electrode attached to the electrooptic material. By using an electrooptic effect, a response speed much higher than that of a conventional variable focusing lens can be obtained.

Figure 2:
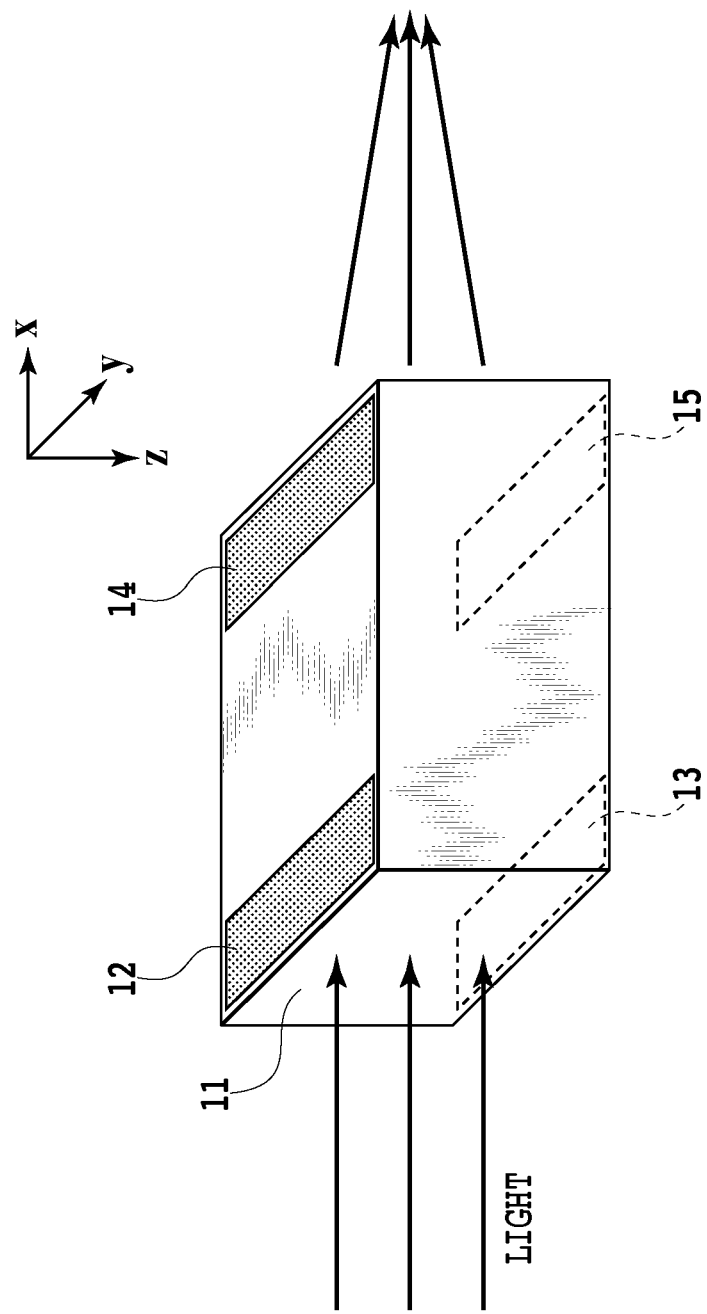
FIG. 2 illustrates the configuration of a variable focusing lens according to the first embodiment of the present invention.

FIG. 2 illustrates the configuration of the variable focusing lens according to the first embodiment of the present invention. A substrate 11 is obtained by machining an electrooptic material to have a plate-like shape. The substrate 11 has strip-like electrodes 4 at the upper surface (the first surface) and the lower surface (the second surface). The substrate 11 is sandwiched between an anode 12 (the first electrode) as an upper electrode and a cathode 13 (the first cathode) as a lower electrode at a side at which light enters. This pair of electrodes is structured to have an interval to another pair of electrodes that is provided at a side at which light exits. The another pair of electrodes is composed of a cathode 14 (the second cathode) as an upper electrode and an anode 15 (the second anode) as a lower electrode. The four strip-like electrodes are shaped so that the sides in the longitudinal direction are all parallel to one another.

Light enters a surface orthogonal to the faces on which the electrodes are placed (the third face) and progresses through the substrate 11 in the x axis direction and passes between the anode 12 and the cathode 13 in a direction vertical to the longitudinal direction of these strip-like electrodes. Next, light passes between the cathode 14 and the anode 15 and subsequently exists through the surface opposed to the entrance face (the fourth surface) into air.

In the configuration as described above, a voltage is applied between the anodes and the cathodes. The voltage polarity of the electrode pair at the side at which light enters is opposite to that for the electrode pair at the side at which light exits (The voltage is applied along z axis direction) The anode 12 and the anode 15 may have different potentials. The cathode 13 and the cathode 14 also may have different potentials. A lower potential among those of the anodes 12 and 15 is set to be higher than a higher potential among those of the cathodes 13 and 14.

Then, the distribution of electric fields is formed between these electrode pairs. The electrooptic effect owned by the substrate 11 modulates the refractive index. When light passes through a portion at which the refractive index is modulated, light is bent by the refractive index distribution and is consequently collected or spread out. When light is collected, the structure according to FIG. 2 functions as a cylindrical convex lens and, when light is spread out, the structure according to FIG. 2 functions as a cylindrical concave lens. Since the level at which light is bent is different depending on an applied voltage, the focal length can be controlled by the voltage.

The electrooptic effect provides a response within the time of 1 μs or less at maximum after a voltage application. Thus, such a variable focusing lens can be realized that responds much higher than a conventional variable focusing lens. As described above, the element shown in FIG. 2 is a cylindrical variable focusing lens and is a base unit constituting various lenses. In order to realize a general spherical surface lens, two elements of the base units may be combined. Specifically, by arranging two base unit elements so as to form an angle of 90 degrees around the optical axis as a center, an equivalent function to that of a spherical surface lens can be realized. In this embodiment, the substrate 11 is made of such a material having inversion symmetry in particular among materials having the electrooptic effect. The reason will be described later.

Figure 3:
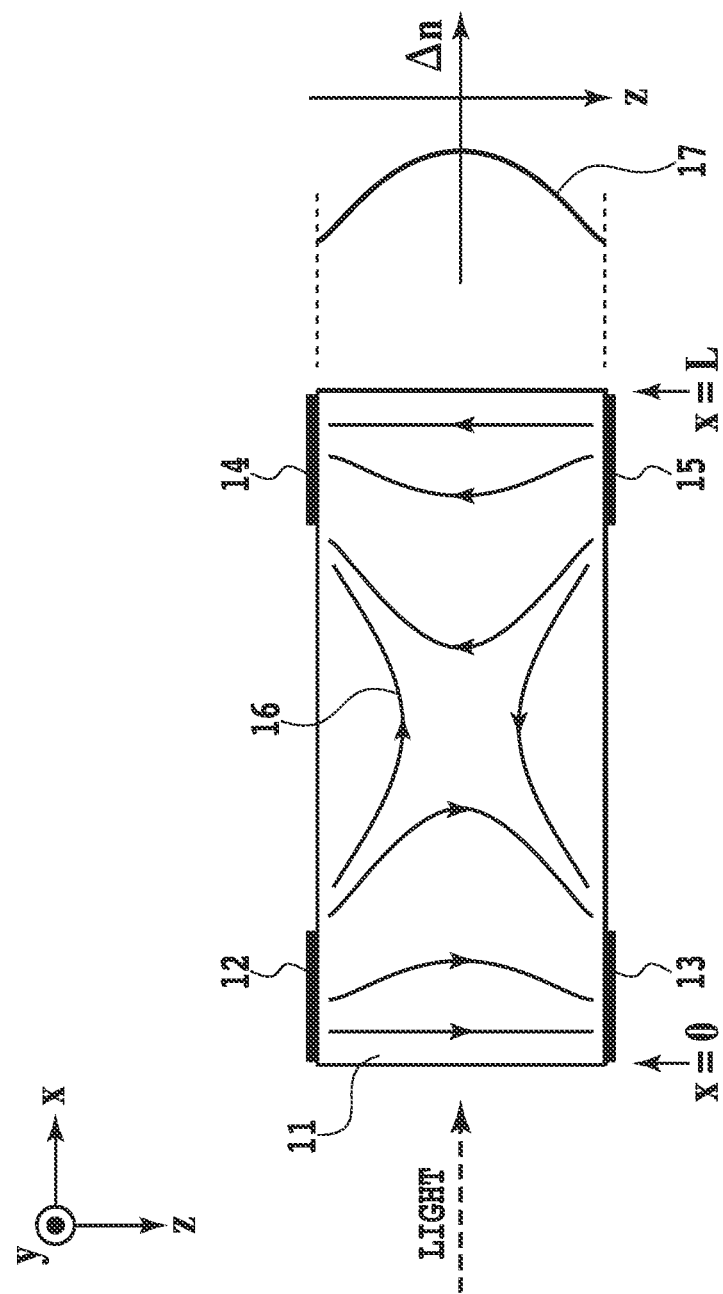
FIG. 3 illustrates the principle of the variable focusing lens according to the first embodiment.

The following section will describe, with reference to FIG. 3, how the refractive index is modulated and how the function as a lens is provided. FIG. 3 is a side view of the variable focusing lens shown in FIG. 2 seen from the y axis direction. When no voltage is applied to the four electrodes, the substrate 11 has a uniform refractive index and thus light directly passes therethrough without being modulated. Thus, no lens function is provided. However, the substrate 11 can be considered as a lens having an infinite focal length in consideration of the fact that, when a plane wave enters the substrate 11, light emitted from the substrate 11 has a plane wave front and has an infinite curvature radius.

When a voltage is applied to the four electrodes, these electrodes have thereamong electric force lines 16 as shown in FIG. 3. The electric force lines 16 are generated not only between the anode 12 and the cathode 13 and between the cathode 14 and the anode 15 but also at the outer side of these electrodes. The generation of the electric force lines means the generation of an electric field. Since the substrate 11 has an electrooptic effect, the refractive index is modulated at the interior of the substrate 11 having an electric field. In the interior of the substrate 11, the neighborhood of the four electrodes (i.e., the neighborhood of the surface of the substrate 11) has a strong electric field and has a large change in the refractive index. On the other hand, the center part of the substrate 11 (the neighborhood of the center in all axial directions) has a relatively-small electric field and has a small change in the refractive index.

The right side of FIG. 3 schematically shows a refractive index modulation curve 17 that shows the distribution of the changes of the refractive index. In the refractive index modulation curve, the vertical axis represents z axis coordinates and the horizontal axis represents a refractive index change Δn between no voltage application and voltage application. FIG. 3 shows that the refractive index generally changes to the negative direction. At the neighborhood of the substrate of the substrate 11 however, the modulation is large and thus the refractive index change Δn is low. At the center part on the other hand, the modulation is small and thus the refractive index change Δn is higher than that at the neighborhood of the surface. When light passes through such a refractive index distribution, a function as a convex lens is provided because light passes through the neighborhood of the surface at a higher speed than at the center part of the substrate 11. Specifically, the focal point moves from an infinite focal length obtained when no voltage is applied to a finite focal length.

(Electrooptic Material)

The electrooptic effect includes some electrooptic effects having different degrees. Generally, the linear electrooptic effect (hereinafter referred to as a Pockels effect) is used. According to the Pockels effect, a change in the refractive index is proportional to the electric field. In the configuration shown in FIG. 2 and FIG. 3, the electric fields in the part between the anode 12 and the cathode 13 are opposite to those in the part between the cathode 14 and the anode 15. Thus, the refractive index distribution between the former electrode pair has inverse sign of that between the latter electrode pair. Thus, if the Pockels effect is used, when light passes between the two pairs of electrodes, light deflection by the refractive index distribution is cancelled at positive and negative sides, thus failing to provide a lens function.

When the quadratic electrooptic effect (hereinafter referred to as a Kerr effect) is used on the other hand, a change in the refractive index is proportional to the square of the electric field. Thus, even when the electric fields in the part between the anode 12 and the cathode 13 are opposite to those in the part between the cathode 14 and the anode 15, the refractive index distribution between the former electrode pair has same sign of that between the latter electrode pair. Thus, light deflection is enhanced without being cancelled.

Many electrooptic materials have no inversion symmetry and produce the Pockels effect. On the other hand, some electrooptic materials have the inversion symmetry, do not produce the Pockels effect, and mainly produce the Kerr effect. Thus, it is important that the substrate 11 of this embodiment is composed of such electrooptic material that has inversion symmetry.

Generally, when dielectric material receives an external electric field, the dielectric material exhibits polarization that is proportional to the electric field. However, if the electric field is removed therefrom, the polarization returns to zero. On the other hand, there are some substances that exhibit finite polarization even after the removal of the electric field. Polarization that exists without an external electric field is called a spontaneous polarization. For some substances, this spontaneous polarization can be inverted with an external electric field. Such substances are called ferroelectric materials. A dielectric material that is not ferroelectric material may be sometimes called a paraelectric material.

A single crystal having inversion symmetry is a crystal that has, when an atomic arrangement is inverted around a certain origin as a center in an xyz coordinate system, such an arrangement that is completely the same as the original atomic arrangement. When a crystal having a spontaneous polarization is inverted on the coordinate axis, the spontaneous polarization is inverted. Thus, such a crystal does not have inversion symmetry. Thus, a ferroelectric material does not have inversion symmetry because it has a spontaneous polarization.

On the other hand, there are also substances having a spontaneous polarization that cannot be inverted with an external electric field. Such a substance has no inversion symmetry but is not a ferroelectric material also, leading to that substances having no inversion symmetry are not always ferroelectric material. No substance exists that is ferroelectric material and that has inversion symmetry.

Electrooptic materials having inversion symmetry include single crystal material having a perovskite-type crystal structure. The perovskite-type single crystal material has, when being used at an appropriate use temperature, a cubic crystal structure in which the crystal structure during use has inversion symmetry. In the cubic crystal phase, the perovskite-type single crystal material does not produce the Pockels effect and mainly produces the Kerr effect instead. For example, the most well-known barium titanate ($BaTiO_3$, hereinafter referred to as BT) undergoes, at a temperature about 120 degrees C., the phase transition from a tetragonal phase to a cubic crystal phase. At a temperature above that at which the phase transition occurs (hereinafter referred to as a phase transition temperature), the BT crystal structure turns to a cubic crystal structure to thereby produce the Kerr effect.

Single crystal material including potassium tantalate niobate (KTN $KTa_{1-x}Nb_xO_3$, $0<x<1$) as a main component has a more preferred characteristic. BT has a fixed phase transition temperature. KTN on the other hand can have a phase transition temperature selected depending on the composition ratio between tantalum and niobium. Thus, the phase transition temperature can be set to be close to the room temperature. KTN has, when being subjected to a temperature higher than the phase transition temperature, a cubic crystal phase, inversion symmetry, and a high Kerr effect. Even when some KTNs have the same cubic crystal phase, a KTN operated at a temperature closer to the phase transition temperature can provide a much higher Kerr effect. Thus, the phase transition temperature set to be close to the room temperature is very important in order to easily realize a high Kerr effect.

Another single crystal material related to KTN includes a main crystal component composed of the group Ia and the group Va of the periodic table. The group Ia may be potassium and the group Va may be material including at least one of niobium or tantalum. Such an additive impurity also can be included that is the group Ia of the periodic table except for potassium (e.g., lithium) or one or a plurality of types of the group IIa. For example, cubic crystal phase KLTN ($K_{1-y}Li_yTa_{1-x}Nb_xO_3$, $0<x<1$, $0<y<1$) crystal also can be used.

(Optical Path Length Modulation)

The following section will describe the optical path length modulation in the case of KTN. In the configuration of FIG. 3, there are two types of polarizations one of which is for the case where the optical electric field is directed in the y axis direction and the other one of which is for the case where the optical electric field is directed in the z axis direction. In the respective two cases, light experiences the following different refractive index modulations $\Delta n_y$ and $\Delta n_z$.

$$\Delta n_y = -\frac{1}{2}n_0^3(s_{12}E_x^2 + s_{12}E_z^2) \quad \text{[Formula 1]}$$

$$\Delta n_z = -\frac{1}{2}n_0^3(s_{12}E_x^2 + s_{11}E_z^2)$$

In the formula, $n_0$ represents a refractive index prior to modulation. $S_{11}$ and $S_{12}$ represent an electrooptic coefficient. $S_{11}$ has a positive value. $S_{12}$ has a negative value. $S_{11}$ has a higher absolute value than that of $S_{12}$. The lens characteristic is evaluated, as shown by the following formula, based on the optical path length modulation $\Delta s$ obtained by integrating this refractive index change along the light progress path (length L).

$$\Delta s_y = \int_0^L \Delta n_y dx \quad \text{[Formula 2]}$$

$$\Delta s_z = \int_0^L \Delta n_z dx$$

Figure 4:
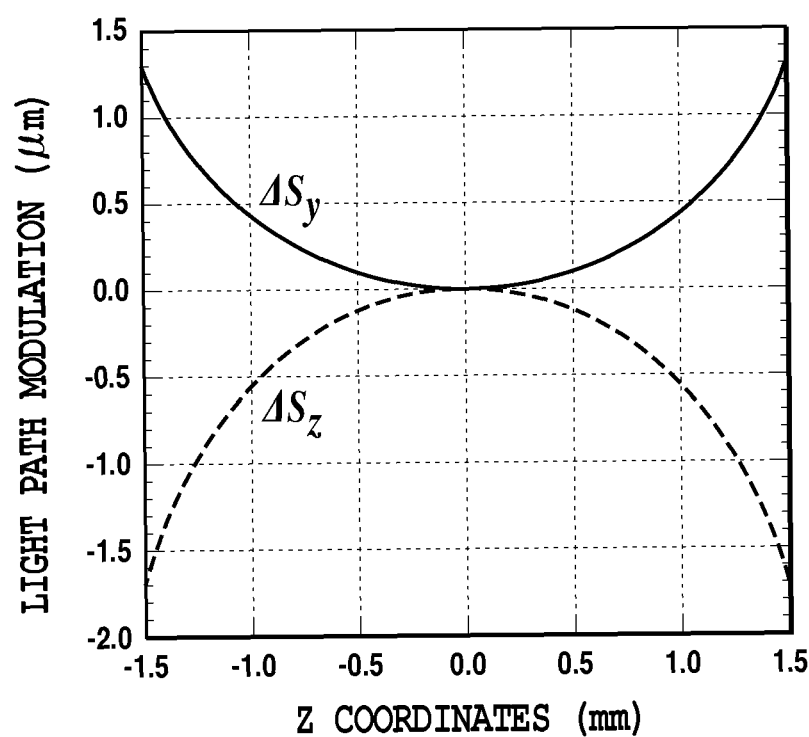
FIG. 4 illustrates an example of the optical path length modulation of the variable focusing lens according to the first embodiment.

FIG. 4 illustrates an example of the optical path length modulation of the variable focusing lens according to the first embodiment in which the distribution of optical path length modulation $\Delta s_y$ and $\Delta s_x$ is calculated by a numerical calculation. This calculation was performed based on the relative permittivity of 20,000, the length L of the substrate 11 of 7 mm, the thickness of the substrate in the z axis direction of 4 mm, the width of each of the four electrode is 0.8 mm, the interval between electrodes on the same plane is 4 mm, and the voltage of 1000V. In FIG. 4, the horizontal axis represents the z coordinates shown in FIG. 2 and the origin is at the center of the substrate 11. The distribution of $\Delta s_y$ forms a downwardly-convex curve, showing that this element functions as a cylindrical concave lens. On the other hand, the distribution of $\Delta s_z$ shows an upwardly-convex curve, showing that this element functions as a cylindrical convex lens. The element may function as a convex lens or a concave lens as in this example of KTN.

(Layout of Electrodes)

In the first embodiment, the upper surface of the substrate 11 has thereon the anode 12 and the cathode 14 and the lower surface has thereon the cathode 13 and the anode 15. A similar configuration also may be considered where the electrodes on the upper surface are both anodes and the electrodes on the lower surface are both cathodes. Although the element also functions as a variable focusing lens in this configuration, the first embodiment is superior in the following point.

When the downsizing of an element is considered, if the size of substrate 11 is tried be reduced in the z axis direction in the configuration of FIG. 3 (i.e., if the thickness of the substrate 11 is tried to be reduced), the reduction is limited by the width of the optical beam passing through the substrate 11. Thus, if the above reduction is tried in the x axis direction in a configuration where both electrodes on the upper surface are anodes and both electrodes on the lower surface are cathodes, a reduced interval between electrodes undesirably causes a reduced lens effect. The minimum interval between electrodes is zero for which the two electrodes on the upper surface are united and the two electrodes on the lower surface are also united. In this case, an electric field within the substrate 11 is uniform and also includes a uniform distribution of refractive indexes, thus undesirably causing a substantially-eliminated lens effect.

On the other hand, in the first embodiment, the minimum interval between the electrodes does not cause these electrodes to be united because different potentials are applied to the anode 12 and the cathode 14 on the upper surface. A reduced electrode interval in the first embodiment causes an increased electric field, thus causing an increased lens effect on the contrary.

Figure 5:
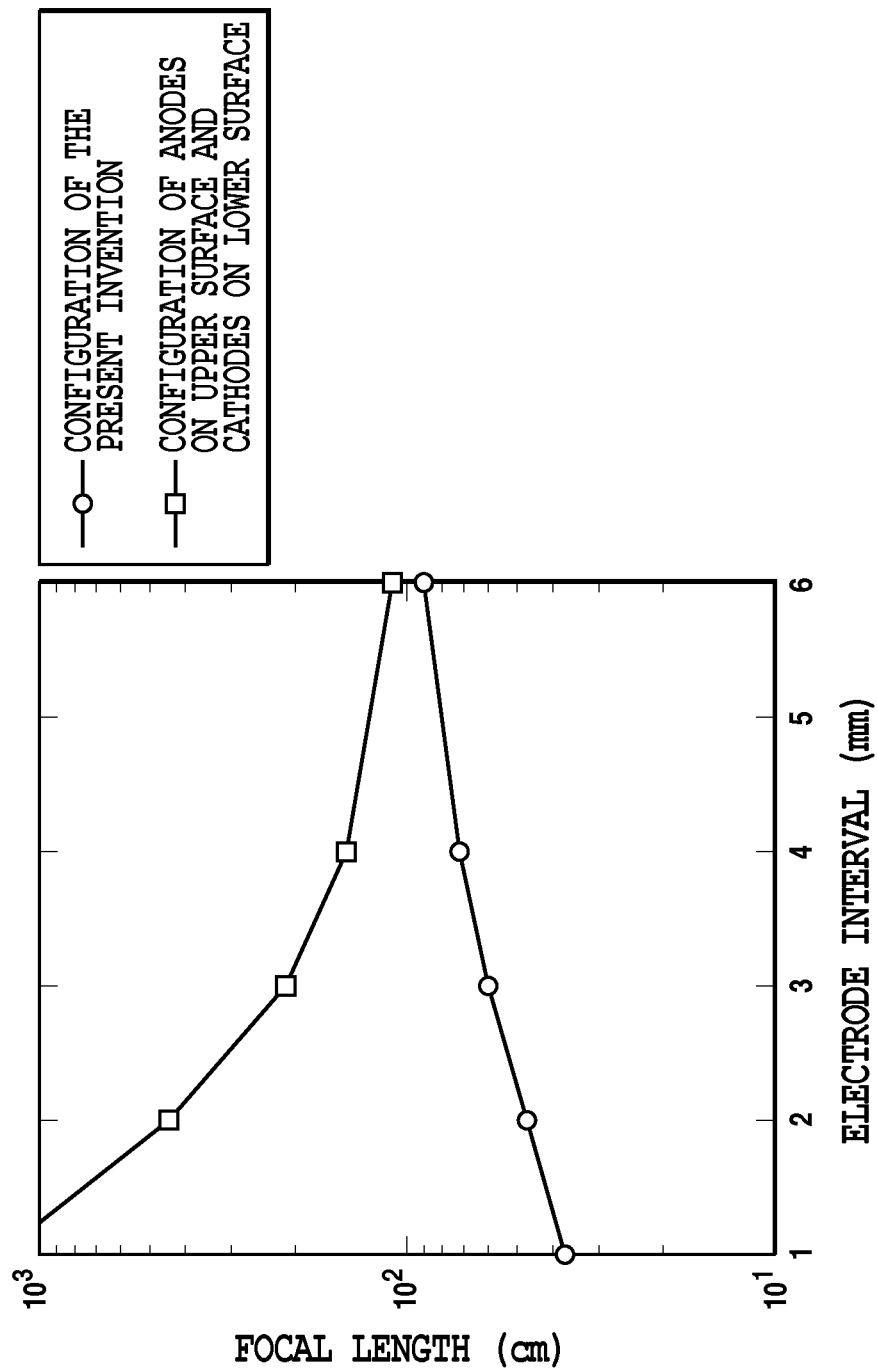
FIG. 5 illustrates the electrode interval dependency of the focal length of the variable focusing lens according to the first embodiment.

FIG. 5 illustrates the dependency on the electrode interval of the focal length of the variable focusing lens according to the first embodiment. In FIG. 5, the focal lengths calculated by numerical calculations are plotted as a function of the electrode interval. Based on the same calculating conditions as those of FIG. 4, calculation was carried out with regard to increased and decreased electrode intervals and simultaneously with increased and decreased lengths of the substrate 11. The optical electric field is in the z axis direction. The smaller the focal length on the vertical axis is, the more light is collected and a higher effect is obtained. The plot of the □ (square) marks shows the case where both electrodes on the upper surface are anodes and both electrodes on the lower surface are cathodes and shows that a decrease of the electrode interval causes the deterioration of the effect. The plot of the ○ (circle) marks shows the case of the first embodiment and shows that a decrease of the electrode interval causes an increase of the effect on the contrary. An increase of the electrode interval causes a reduced interaction between the two electrode pairs, thus causing a similar effect to be converged in both of the configurations. Since the substrate 11 has a thickness of 4 mm, with reference to FIG. 5, the configuration of the first embodiment is advantageous when the electrode interval is smaller than 6 mm which is 1.5 times the thickness.

As described above, the use of KTN allows, when being combined with a different polarization depending on a case, the element to be used as a convex lens or to be used as a concave lens. On the other hand, it has been known that an electric field applied to the electrooptic crystal causes a change of the physical shape due to the piezoelectric effect or the electrostrictive effect. The piezoelectric effect is a phenomenon in which the distortion is in proportion to the applied electric field. The electrostrictive effect is a phenomenon in which the distortion is in proportion to the square of the applied electric field. The change of the physical shape is represented by the sum of the piezoelectric effect and the electrostrictive effect. Generally, electrooptic material having inversion symmetry does not include therein a piezoelectric effect and thus has an electrostrictive effect only. This electrostrictive effect may cause the distribution of refractive indices to be slightly dislocated from the distribution obtained based on the calculation of the electric field distribution as described above.

With regard to this point, $\Delta n_z$ (or the optical path length $S_z$) has an actual value having a smaller difference from the calculation value than in the case of $\Delta n_y$ (or the optical path length $S_y$). Specifically, the electrode configuration of the first embodiment is preferred because z-component of the electric field is strong all over and thus a value closer to the calculated refractive index distribution can be obtained by providing the optical vibration electric field to be parallel to the z axis. The x-component x of the electric field is also strong. However, the optical axis setting in the first embodiment cannot provide the optical vibration electric field to be parallel to the x axis.

(Electrode Material)

When a high voltage is applied to the electrooptic material, charge may be inputted through the electrode to cause space change in the material. This space charge causes the inclination in intensity of the electric field in the direction in which the voltage is applied, thus also causing an inclined modulation of refractive indexes. Thus, no space charge is desirably formed in the substrate 11 during the voltage application of the substrate 11 in order to obtain a desired refractive index distribution for allowing the electrooptic material to function as a lens or in order to prevent the deflection of light passing through the electrooptic material.

The amount of the space charge depends on the carrier injection efficiency. Thus, a small injection efficiency of the carrier injected from the electrode is preferred. When the carriers in the electrooptic crystal contributing to the electric conduction are electrons, an increase in the work function of the electrode material causes a higher schottky barrier between the electrode and the substrate, thus reducing the carrier injection efficiency. Thus, the electrode is preferably composed of material that forms the schottky barrier with the electrooptic material. Specifically, when the carrier in the electrooptic crystal contributing to the electric conduction is an electron, the electrode material preferably has a work function of 5.0 eV or more. For example, electrode materials having a work function of 5.0 eV or more can include Co (5.0). Ge (5.0). Au (5.1). Pd (5.12). Ni (5.15). Ir (5.27). Pt (5.65), and Se (5.9) in which the values in the parentheses represent a work function on the basis of a unit of eV.

On the other hand, when the carriers in the electrooptic crystal contributing to the electric conduction are holes, the electrode material preferably has a work function lower than 5.0 eV in order to suppress the hole injection. For example, electrode material having a work function lower than 5.0 eV can be Ti (3.84). Since a Ti single layer electrode is oxidized to have a high resistance, such an electrode is generally used that is obtained by layering Ti/Pt/Au in this order to join the Ti layer with the electrooptic crystal. Transparent electrodes such as indium Tin Oxide (ITO) or ZnO also can be used.

Application Example

Figure 6:
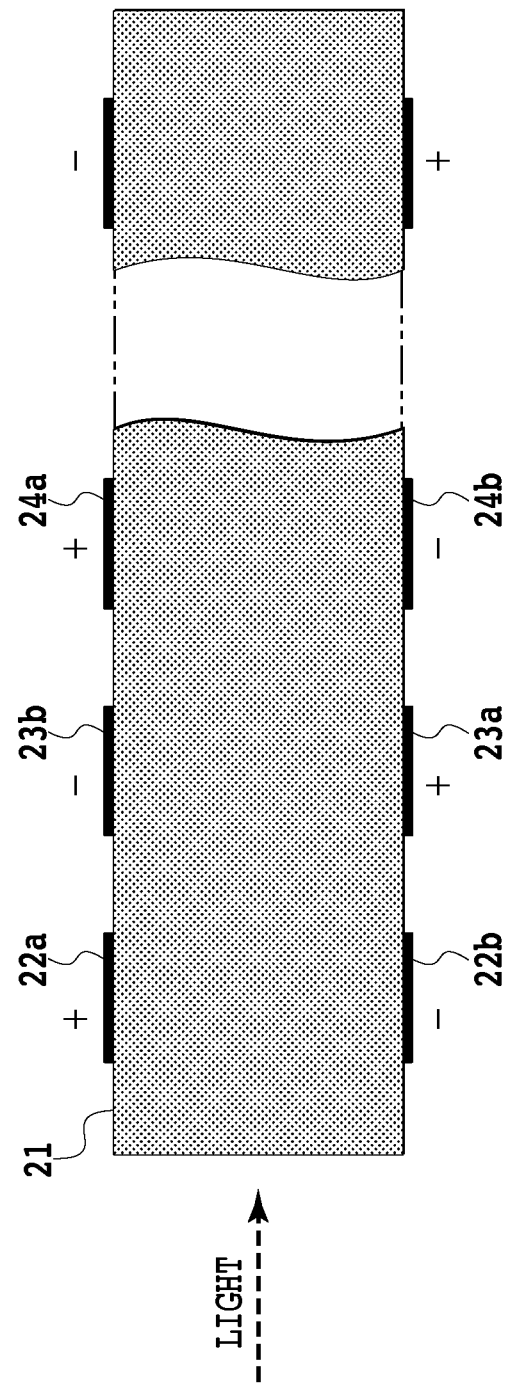
FIG. 6 illustrates the configuration of a variable focusing lens according to the second embodiment of the present invention.

A cylindrical variable focusing lens has been described that functions as a base unit constituting various lenses. Next, the following section will describe an application example using this base unit. FIG. 6 illustrates a variable focusing lens according to the second embodiment of the present invention in which the above-described base units are arranged in series along the optical axis direction. One substrate 21 includes a plurality of electrodes 22a, 22b, 23a, 23b, 24a, and 24b... so that opposite voltages are applied to electrode pairs adjacent to each other. The element having the configuration as described above can provide a high lens effect even when receiving a low voltage. The number of pairs of electrodes may be an even number or an odd number so long as the number is 2 or more.

(Biaxial Variable Focusing Lens)

As described above, in order to realize a general spherical surface lens, two base unit elements may be arranged in series along the optical axis direction (x axis) so that electric fields are applied to form an angle of 90 degrees to each other. However, in the case of single crystal material having inversion symmetry such as KTN, there may be a case as shown in FIG. 4 in which polarization causes the lens effect to be totally inverted from the one of a convex lens to the one of a concave lens. In order to realize a spherical surface lens, light with the electric field vibrating in the z axis direction is allowed to enter the first base unit element and is collected in the z axis direction. Then, this light is directly allowed to enter the second base unit element rotated by 90 degrees. In the case of this configuration however, the light is undesirably spread out in the y axis direction, thus failing to provide a function of a spherical surface lens.

In order to provide a correct function of a spherical surface lens, prior to allowing light to enter the second base unit element, the polarization direction also must be rotated by 90 degrees in accordance with this element. To solve this, a structure is provided in which the first base unit element and the second base unit element have therebetween a polarization rotation element. There are various polarization rotation elements among which a half-wave plate is most commonly used.

A half-wave plate is an optical element that causes two linearly polarized waves orthogonal to each other to have therebetween a phase shift corresponding to a half of the wavelength (i.e., a phase shift of $\pi$ radian). Typically, a half-wave plate is obtained by machining a birefringent material to have a plate-like shape. Single crystal material having inversion symmetry such as KTN generally does not have birefringence. However, by applying an electric field in one direction, birefringence is caused in a direction parallel to the electric field and in a direction orthogonal thereto. This behavior can be used to constitute a half-wave plate by KTN.

Figure 7:
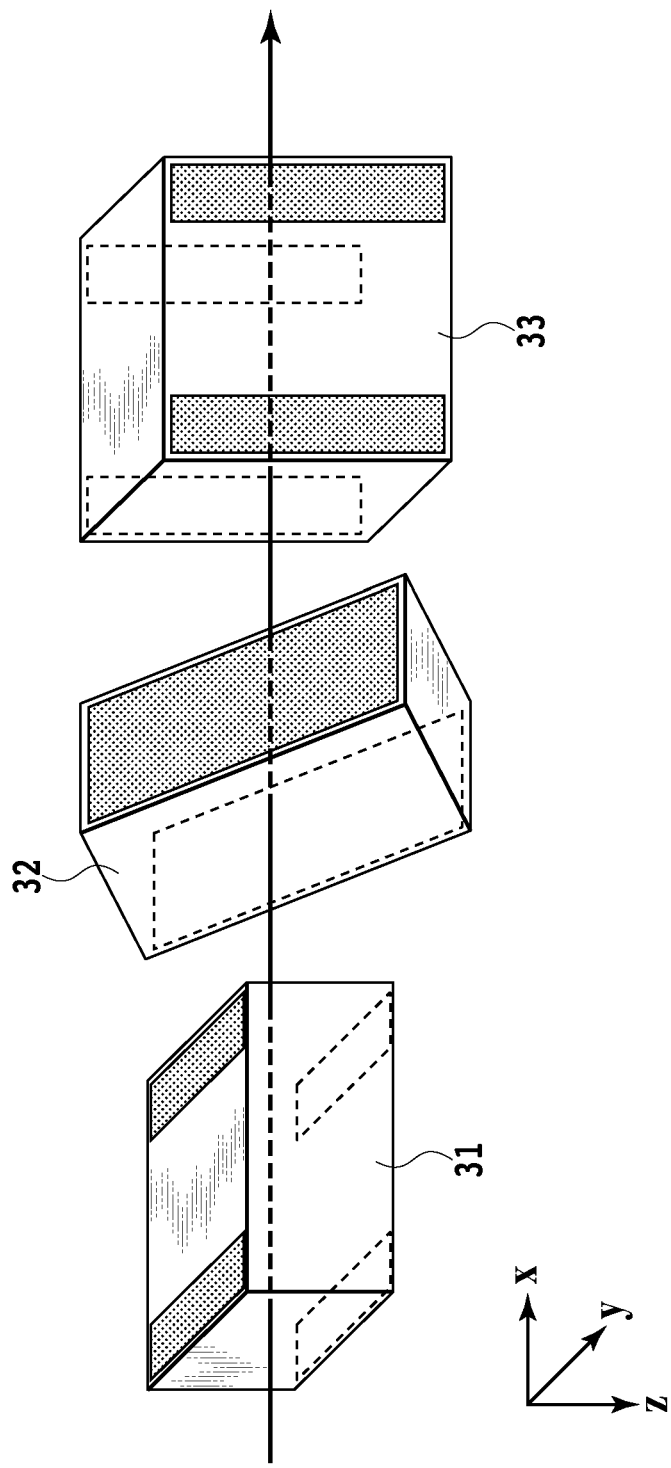
FIG. 7 illustrates the configuration of a variable focusing lens according to the third embodiment of the present invention.

FIG. 7 illustrates the configuration of a variable focusing lens according to the third embodiment of the present invention. The biaxial variable focusing lens is structured so that the first base unit element 31, a KTN half-wave plate 32, and the second base unit element 33 are arranged in series along the optical axis direction (x axis). The first base unit element 31 and the second base unit element 33 apply electric fields vertical to the optical axis and are arranged so that each direction of the electric fields forms an angle of 90 degrees (z axis and y axis in FIG. 7) to each other. The KTN half-wave plate 32 has a rectangular parallelepiped shape in which two surfaces opposed to each other have thereon an electrode film substantially over the entire surface. By applying a voltage to this pair of electrodes, an electric field vertical to these two surfaces is uniformly formed. The first base unit element 31 and the second base unit element 33 are arranged so that the direction of this electric field forms an angle of 45 degrees to the direction along which electric fields are applied for the first base unit element 31 and for the second base unit element 33. This consequently rotates, by 90 degrees, the polarization of light having passed through the first base unit element 31.

When a half-wave plate is similarly composed by KTN as in the case of the above-described cylindrical variable focusing lens as a base unit element, a single substrate composed of an electrooptic material is formed with a composite structure of the above devices. Then, an electrode for the first base unit element 31, an electrode for the KTN half-wave plate 32, and an electrode for the second base unit element 33 are arranged and attached in this order. In this manner, an integrated spherical surface variable focusing lens also can be composed.

(Microscope)

The variable focusing lens according to this embodiment has been described. An optical system for a microscope generally uses the biaxial variable focusing lens shown in FIG. 7. A half-wave plate may be made of KTN or also may be made of general quartz, mica, or resin for example.

Figure 8:
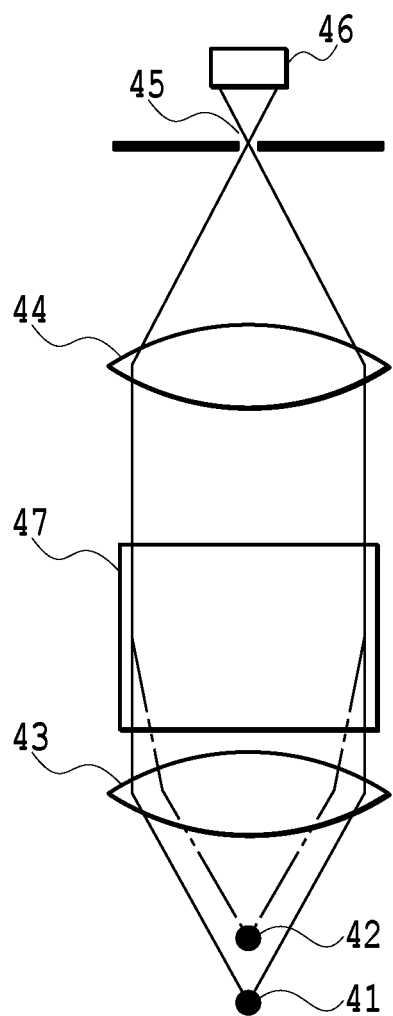
FIG. 8 illustrates the configuration of the microscope according to one embodiment of the present invention.

FIG. 8 illustrates the configuration of the microscope according to one embodiment of the present invention. The microscope causes the light emitted from the measuring object 41 to be a parallel beam by the lens 43 (objective lens). Then, the focal point of the beam is adjusted by the biaxial variable focusing the lens 47. Then, the light is collected again by the lens 44. At the position of the light collecting point, a pinhole 45 is provided that has a similar diameter to the spot diameter. Then, power of the light having passed through the pinhole 45 is measured by the light detector 46.

Figure 1:
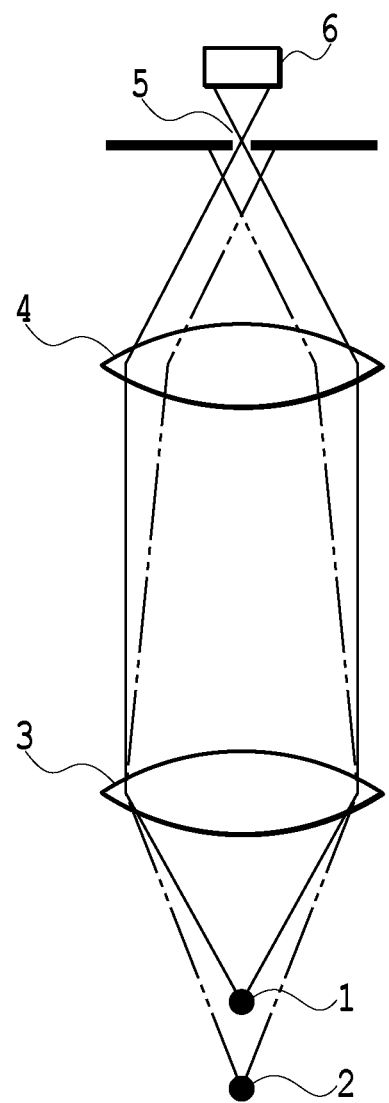
FIG. 1 illustrates the principle of a conventional confocal microscope.

When there is no biaxial variable focusing lens, light beam is substantially a parallel beam as shown in FIG. 1 and the measuring object 41 shown by the black circle is to be observed. Even when the biaxial variable focusing the lens 47 is inserted, the parallel beam is directly allowed to pass in the off status (a status where the voltage is zero). Thus, the measuring object 41 shown by the black circle is still to be observed. When a voltage is applied to the biaxial variable focusing lens 47, this lens provides a light collecting action to change the light beam as shown by the broken line of FIG. 8. Consequently, the observation position moves to the upper measuring object 42.

As a result, the scanning in the height direction of the confocal microscope can be performed with an improved scanning speed expected to be improved by about 5 digits at maximum when compared with a mechanical operation. Optionally, a two-dimensional beam deflector may be inserted between the biaxial variable focusing lens 47 and the lens 44 or between the lens 43 and the biaxial variable focusing lens 47 to thereby achieve a high-speed three-dimensional operation.

This embodiment is not limited to a confocal microscope. Thus, a variable focusing lens also may be inserted to a general microscope optical system. In the case of a general optical system, the light detector and the pinhole of FIG. 8 are not required and the lens 44 may be an optical system such as an ocular lens.

Although the above microscope has been described based on an assumption that the biaxial variable focusing lens is a convex lens, the biaxial variable focusing lens also can be used as a concave lens by changing the polarization.

Illustrative Embodiment

As shown in FIG. 2, the substrate 11 obtained by machining electrooptic material to have a plate-like shape has, at the upper surface and the lower surface, the anode 12, the cathode 13, the cathode 14, and the anode 15. The substrate 11 is obtained by cutting a block out of KTN single crystal to have a shape of 7 mm×7 mm×(thickness T=)4 mm. All of the 6 surfaces of the substrate 11 are parallel to the crystallographic (100) face and are subjected to an optical polishing. Since this KTN single crystal has a phase transition temperature of 35 degrees C., the substrate is used at 40 degrees C. slightly higher than 35 degrees C. The relative dielectric constant at this temperature is 20,000. The 4 electrodes have a 0.8 mm×7 mm strip-like shape and are arranged to have an interval of 4 mm on a single surface. Two pairs of electrodes are formed on 7 mm×7 mm faces of the substrate 11 by evaporating platinum (Pt). The respective sides of an electrode are parallel to the sides of the substrate 11.

While this variable focusing lens is being temperature-controlled at 40 degrees C., collimated laser light is allowed to enter the lens. Light polarization is linear and its vibrating electric field is parallel to the z axis direction. When a voltage of 1000V is applied between upper and lower electrodes, light emitted from the substrate 11 is collected in the z axis direction and functions as a cylindrical convex lens. The focal length is 72 cm. When the application voltage is changed to 500V, the light collecting effect is reduced and the focal length changes to 290 cm. When no voltage is applied thereto, no light collecting effect is provided and the focal length is infinite. Thus, by changing the application voltage form 0V to 1000V, the focal length can be changed from the infinite one to 72 cm. The focal length can be changed by merely changing the application voltage. Thus, the required response time is 1 μs or shorter, which is improved by 3 digits or more when compared with the response time of the conventional variable focusing lens.

The measurement is also performed with a 90 degree-rotated polarization without changing the direction along which light proceeds. Specifically, the direction of the optical vibration electric field is in the y axis direction. In this case, the lens functions as a concave lens. When the application voltage is 1000V, the focal length is 93 cm. Thus, by changing the application voltage from 0V to 1000V, the focal length can be changed from the infinite one to 93 cm.

A biaxial variable focusing lens is configured by combining two variable focusing lenses and a half-wave plate as shown in FIG. 7. The half-wave plate is made of quartz. The two variable focusing lenses have the same characteristic and are arranged to sandwich the half-wave plate. Thus, by applying the same voltage to the two variable focusing lenses, light collection as in a general spherical surface lens can be obtained.

Furthermore, this biaxial variable focusing lens is incorporated in the microscope having the optical system shown in FIG. 8. The lens 43 (objective lens) had a focal length of 25 mm. When no voltage being applied to the two variable focusing lenses, the focal point is adjusted. While a voltage is applied, the position in the object space that came into focus moves upwardly. When the application voltage was 1500V, the observation position in the object space moved y 1.5 mm from the original position. Furthermore, the time of 1 μs or shorter could be achieved as a time required to move the position of the focal point by 1.5 mm.

The invention claimed is:

1. A variable focusing lens, comprising:
a single crystal electrooptic material having inversion symmetry;
a first anode formed on a first surface of the electrooptic material;
a first cathode that is formed on a second surface opposed to the first surface and that is formed at a position opposed to the first anode;
a second cathode that is formed on the first surface and that is provided to have an interval to the first anode; and
a second anode that is formed on the second surface, that is provided to be opposed to the second cathode, and that is provided to have an interval to the first cathode,
wherein:
an optical axis is set so that, when light enters through a third face orthogonal to the first surface, the light passes through a first pair of electrodes composed of the first anode and the first cathode and subsequently passes through a second pair of electrodes composed of the second anode and the second cathode to subsequently exit through a fourth surface opposed to the third face, and
a voltage applied between the first pair of electrodes and the second pair of electrodes is changed to thereby change the focal point of light emitted from the fourth surface of the electrooptic material.

2. The variable focusing lens according to claim 1, wherein the electrooptic material is a single crystal material having perovskite structure.

3. The variable focusing lens according to claim 2, wherein the electrooptic material is potassium tantalate niobate.

4. The variable focusing lens according to claim 2, wherein: the electrooptic material includes a main crystal component composed of a group Ia and a group Va of a periodic table in which the group Ia is potassium and the group Va includes at least one of niobium or tantalum.

5. The variable focusing lens according to claim 4, wherein: the electrooptic material further includes an additive impurity that is the group Ia of the periodic table except for potassium or one or a plurality of types of the group IIa.

6. The variable focusing lens according to claim 1, wherein: the first and second anodes and the first and second cathodes are composed of material that forms a schottky barrier junction with the electrooptic material.

7. The variable focusing lens according to claim 6, wherein: each of the first and second anodes and the first and second cathodes has a strip shape for which sides in the longitudinal direction are all parallel to one another.

8. The variable focusing lens according to claim 6, wherein: when assuming that the first anode and the second cathode have therebetween an interval G and the electrooptic material has a thickness T, G<1.5T is established.

9. A variable focusing lens, comprising:
a single crystal electrooptic material having inversion symmetry; and
2N electrodes formed on a surface of the electrooptic material,
wherein:
when 1≤k≤N-1 is established, an electrode that is formed on a first surface of the electrooptic material and that is a kth electrode from a light entrance side is assumed as a kth anode and an electrode that is formed on a second surface opposed to the first surface and that is formed at a position opposed to the kth anode is assumed as a kth cathode and,
an electrode that is formed on the first surface and that is provided to have an interval to the kth anode is assumed as a k+1th cathode, and an electrode that is formed on the second surface, that is formed at a position opposed to the k+1th cathode, and that is provided to have an interval to the k+1th cathode is assumed as a k+1th anode,
when light enters through a third face orthogonal to the first surface, an optical axis is set so that the light passes between a pair of electrodes composed of the kth anode and the kth cathode and a pair of electrodes composed of an Nth anode and an Nth cathode to exit through a fourth surface opposed to the third face, and
by changing an application voltage between the kth one and the Nth one, a focal point of light having exited through the fourth surface of the electrooptic material can be changed.

10. A microscope in which an optical system includes a variable focusing lens, wherein:
the variable focusing lens is provided so that a first base unit element, a half-wave plate, and a second base unit element are provided in series along an optical axis direction, and the first base unit element and the second base unit element apply electric fields vertical to the optical axis and are arranged so as that each direction of the electric fields is perpendicular to each other, and the half-wave plate is provided to form an angle of 45 degrees to the directions along which the electric fields are applied from the first base unit element and the second base unit element,
each of the first and second base unit elements includes:
a single crystal electrooptic material having inversion symmetry;

a first anode formed on a first surface of the electrooptic material;
a first cathode that is formed on a second surface opposed to the first surface and that is formed at a position opposed to the first anode; and
a second anode that is formed on the second surface, that is provided to be opposed to the second cathode, and that is provided to have an interval to the first cathode,
an optical axis is set so that, when light enters through a third face orthogonal to the first surface, the light passes through a first pair of electrodes composed of the first anode and the first cathode and subsequently passes through a second pair of electrodes composed of the second anode and the second cathode to subsequently exit through a fourth surface opposed to the third face, and
a voltage applied between the first pair of electrodes and the second pair of electrodes is changed to thereby change the focal point of light emitted from the fourth surface of the electrooptic material.

11. The microscope according to claim 10, wherein: the electrooptic material is a single crystal material having perovskite structure.

12. The microscope according to claim 11, wherein: the electrooptic material is potassium tantalate niobate.

13. The microscope according to claim 11, wherein: the electrooptic material includes a main crystal component composed of a group Ia and a group Va of a periodic table in which the group Ia is potassium and the group Va includes at least one of niobium or tantalum.

14. The microscope according to claim 13, wherein: the electrooptic material further includes an additive impurity an additive impurity that is the group Ia of the periodic table except for potassium or one or a plurality of types of the group IIa.

15. The microscope according to claim 10, wherein: the first and second anodes and the first and second cathodes are composed of material that forms a schottky barrier junction with the electrooptic material.

16. The microscope according to claim 15, wherein: each of the first and second anodes and the first and second cathodes has a strip shape for which sides in the longitudinal direction are all parallel to one another.

17. The microscope according to claim 15, wherein: he first anode and the second cathode have therebetween an interval G and the electrooptic material has a thickness T, G<1.5T is established.

18. The microscope according to claim 10, wherein:
each of the first and second base unit elements includes the 2N electrodes formed on a surface of the electrooptic material,
when $1 \leq k \leq N-1$ is established, an electrode that is formed on a first surface of the electrooptic material and that is a kth electrode from a light entrance side is assumed as a kth anode and an electrode that is formed on a second surface opposed to the first surface and that is formed at a position opposed to the kth anode is assumed as a kth cathode and,
an electrode that is formed on the first surface and that is provided to have an interval to the kth anode is assumed as a k+1th cathode, and an electrode that is formed on the second surface, that is formed at a position opposed to the k+1th cathode, and that is provided to have an interval to the k+1th cathode is assumed as a k+1th anode,
when light enters through a third face orthogonal to the first surface, an optical axis is set so that the light passes between a pair of electrodes composed of the kth anode and the kth cathode and a pair of electrodes composed of an Nth anode and an Nth cathode to exit through a fourth surface opposed to the third face, and
by changing an application voltage between the kth one and the Nth one, a focal point of light having exited through the fourth surface of the electrooptic material can be changed.

* * * * *